(12) United States Patent
Klemme et al.

(10) Patent No.: US 11,709,237 B2
(45) Date of Patent: Jul. 25, 2023

(54) LIDAR SYSTEMS AND METHODS

(71) Applicant: LUMINAR TECHNOLOGIES, INC., Orlando, FL (US)

(72) Inventors: Daniel Joseph Klemme, Minneapolis, MN (US); Pierre Asselin, Minneapolis, MN (US)

(73) Assignee: LUMINAR TECHNOLOGIES, INC., Orlando, FL (US)

( * ) Notice: Subject to any disclaimer, the term of this patent is extended or adjusted under 35 U.S.C. 154(b) by 182 days.

(21) Appl. No.: 16/916,630

(22) Filed: Jun. 30, 2020

(65) Prior Publication Data

US 2021/0405164 A1 Dec. 30, 2021

(51) Int. Cl.
*G01S 17/10* (2020.01)
*G01S 7/4865* (2020.01)
*G01S 7/481* (2006.01)
*G01S 17/89* (2020.01)

(52) U.S. Cl.
CPC .......... *G01S 7/4865* (2013.01); *G01S 7/4817* (2013.01); *G01S 17/10* (2013.01); *G01S 17/89* (2013.01)

(58) Field of Classification Search
CPC ...... G01S 7/4865; G01S 7/4817; G01S 17/10; G01S 17/89; G01S 7/497; G01S 17/42; G01S 17/32

See application file for complete search history.

(56) References Cited

U.S. PATENT DOCUMENTS

| 4,533,242 | A | * | 8/1985 | McLauchlan | G01S 17/10 356/5.07 |
| 2006/0290917 | A1 | * | 12/2006 | Soreide | G01S 17/36 356/5.11 |
| 2011/0032509 | A1 | * | 2/2011 | Bridges | G01S 17/42 356/5.13 |
| 2017/0146641 | A1 | | 5/2017 | Walsh et al. | |
| 2018/0217258 | A1 | | 8/2018 | Hirasawa et al. | |
| 2019/0239753 | A1 | | 8/2019 | Wentz | |
| 2020/0116832 | A1 | * | 4/2020 | Singer | G01S 7/4865 |
| 2021/0341611 | A1 | * | 11/2021 | Boloorian | G01S 17/58 |

OTHER PUBLICATIONS

Baghmisheh, Behnam Behroozpour, "Chip-scale Lidar", EECS Department, University of California, Berkeley, Technical Report No. UCB/EECS-2017-4; Jan. 19, 2017.

* cited by examiner

*Primary Examiner* — Jonathan M Hansen
(74) *Attorney, Agent, or Firm* — Holzer Patel Drennan (57) ABSTRACT

The technology disclosed herein includes a system having a light source configured to generate a laser signal, an optical signal splitter circuit configured to split the laser signal into a first laser signal for transmission to a plurality of targets and a second laser signal, an optical signal scanner configured to transmit the first laser signal to the plurality of targets, two or more optical delay lines configured to receive the second laser signal, wherein each of the two or more optical delay lines adds a predetermined time delay to the second laser signal to generate a delayed second laser signal, and a detector configured to receive a reflected laser signal from the plurality of targets, wherein the reflected laser signal includes a reflection of the first laser signal from the plurality of targets, and the delayed second laser signal.

20 Claims, 7 Drawing Sheets

LIDAR SYSTEMS AND METHODS

BACKGROUND

Light detection and ranging (LiDAR) is a process for measuring distances. For example, energy such as laser light can be directed toward a target object, and the energy reflected by the target object can be detected and measured by a sensor or detector. The distance to the target object can be calculated based on the speed of the light and the time it takes for energy to travel to the target object and back to the sensor. In some cases, LiDAR can use ultraviolet, visible, or near-infrared sources to sense, image, identify, or map objects. In some cases, the sensor uses coherent detection, where a portion of the energy from the laser is separated and made to interfere optically with the energy reflected by the target. In the case of a coherent detection scheme, LiDAR loses signal if the target is farther than half of the coherence length of the light source. However, coherence can be restored if an equivalent delay is introduced to the separated light prior to interference. In some cases, the delay could be introduced via coiled optical fibers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a technology disclosed herein includes generating a laser signal with a light source of a light detection and ranging system, splitting the laser signal with an optical signal splitter circuit of the light detection and ranging system to produce a first laser signal for transmission to a target and a second laser signal, known as the local oscillator (LO), transmitting the first laser signal to the target with an optical signal scanner of the light detection and ranging system, wherein the first laser signal is reflected by the target to produce a scattered receiver beam, routing the second laser signal through an optical delay line of the light detection and ranging system, wherein the optical delay line adds a predetermined time delay to the second laser signal to generate a delayed second laser signal, and receiving the scattered receiver beam and the delayed second laser signal with a detector of the light detection and ranging system.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Implementations described herein provide systems for using one or more optical delay lines in a coherent light detection and ranging (LiDAR) system. According to some embodiments, a plurality of optical delay lines can be provided between an optical signal source and an optical signal detector of a light detection and ranging (LiDAR) system. An optical switch may be used to select one of the plurality of optical delay lines to add a spatial optical delay before the signal is input to the optical signal detector. In some embodiments, the optical signal may be divided into a plurality of (temporally) interleaving frames, wherein each of the interleaving frames corresponds to a combination of different target (ranging) distance and optical delay line. In some embodiments, one or more optical delay lines can be used to improve long range LiDAR coherence.

Embodiments of the present invention encompass systems and methods which employ the use of an optical delay in part of a coherent LiDAR system. Such embodiments can operate to extend the maximum range of a given coherent LiDAR system. Such embodiments can also reduce the constraints on how thin the laser linewidth must be in order to meet a given range target. In some cases, embodiments can enable switching between two or more sets of optical delays to allow a given system to scan targets in different range sets. For example, a system could switch between different delays for a "short", "medium", and "long" range setting.

Figure 1:
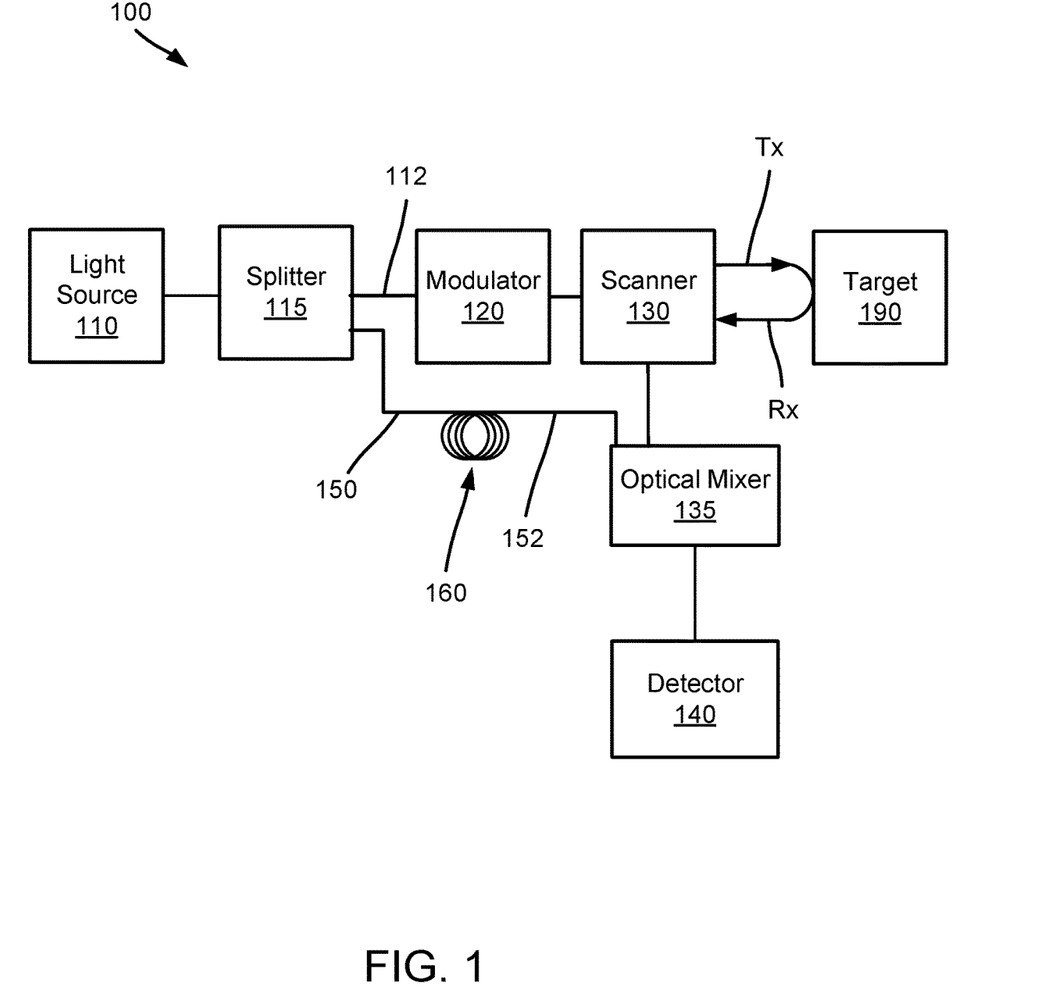
FIG. 1 illustrates an example block diagram of a LiDAR system having an optical delay line.

FIG. 1 schematically illustrates aspects of an exemplary coherent LiDAR system 100, according to embodiments of the present invention. As shown here, system 100 includes a light source 110, a splitter 115, a modulator 120, a scanner 130, an optical mixer 135, and a detector 140. In some embodiments, source 110 can be configured to provide any desired type of electromagnetic waves. The splitter 115 may be configured to split the electromagnetic waves from the source 110 into two output electromagnetic waves, one of which is used as a local oscillator (LO) 150. In some embodiments, scanner 130 is an optical signal scanner. In some embodiments, scanner 130 includes a collection lens. In operation, light 112 from the light source 110 is modulated in some way, for example continuous frequency shift or pseudo-random binary sequence (PRBS) pattern on the phase, by the modulator 120 and sent through the scanner 130 to a target 190. As shown here, a transmitter beam Tx (incident light or target beam) is emitted from the scanner 130, and reflected by the target 190 to provide a receiver beam Rx (scattered light). In some cases, the transmitter beam Tx is scanned by the scanner throughout an angular field, for example the angular field can correspond to a 30° field of view, a 60° field of view, or any other desired angular field of view. The scanner 130 is also configured to collect the scattered light Rx. The collected scattered light Rx is combined at the optical mixer 135 with the local oscillator (LO) reference beam 150. According to some embodiments, coherent LiDAR involves optically mixing scattered light Rx collected from a target and a local oscillator reference beam 150. Specifically, the optical mixer 135 does the mixing or addition of the Rx and the LO 152. Then the output from the optical mixer is input to the detector 140.

Specifically, the light in the LO 152 is substantially correlated with the light in the Rx, resulting in higher signal to noise ratio (SNR) for the detector 140. This can be achieved using laser light from the light source 110. However, laser light has a finite spread of frequencies, called the linewidth, which adds some randomness to the electric fields. For example, a LiDAR system that is rated to provide a 1.5 MHz laser linewidth may in fact provide frequency values within a range from 200 THz to 200.0000015 THz. The nonzero linewidth reduces the correlation between the optical electric fields of the two arms, an effect known as decoherence. Relatedly, the wavelength may vary as well. The greater the spatial or temporal delay between the local oscillator beam 150 and the scattered light Rx light (for example, the farther the distance to the target), the greater the decoherence and the worse the signal-to-noise ratio (SNR) performance becomes. The loss in SNR due to decoherence is exponential with delay, making it difficult to make up for these losses by longer integration times or higher laser power.

The inclusion of an artificial delay line 160 in the local oscillator arm 150 of the system 100 can operate to offset the effects of signal degradation at long distances without using a more expensive laser or other linewidth reduction techniques. Hence, as shown in FIG. 1, the system 100 includes a local oscillator 150 having a delay arm 160. In some instances, the delay arm 160 provides a delay distance d to the local oscillator 150. According to some embodiments, a spatial optical delay d can operate to balance the arms (150, Rx) of the detector 140 for a target at a range d/2, or a total round-trip delay d. The decoherence losses at this distance will then be substantially reduced to zero. In this sense, a delay line of length d will perfectly balance with a target at range d/2 (total round-trip distance of d). This may come at the cost of lower signal from nearby targets being less coherent, but there is much more light available to collect for nearby targets, meaning that there is a net gain in the overall range that can be detected, as long as the decoherence is not overwhelmingly strong. The delay line 160 is an optical delay line that may be implemented using cavity delay, optical fiber delay, free space delay, etc. The delay line 160 applies a transform to the local oscillator signal 150 to generate a delayed laser signal 152 by delaying it by a predetermined time.

In some instances, the optical delay 160 can take the form of a long fiber (e.g. where longer fiber lengths provide longer delays). For example, the long fiber can be provided as a loop of fiber. In some instances, the optical delay 160 can take the form of an optical cavity.

The nature of the modulation provides information on the travel time and therefore allows the detector 140 to extract the range to the target 190. If the local oscillator light 150 and the scattered light Rx light maintain coherence, the signal from the scattered light Rx experiences a large gain, which in the absence of the delay line 160 decreases exponentially with target range, as decoherence effects begin to appear. In some embodiments, the distance to the target object can be calculated based on the speed of the energy and the time it takes for energy to travel to the target object and back to the detector. In some embodiments, by comparing and/or correlating the LO reference beam and Rx beam at any given point in time, it is possible to calculate distance to a single point on the target. Therefore, scanning the transmitted laser signal Tx over the target allows determining the shape and topology details of the target (e.g. by analyzing various points or locations on the target).

The addition of a delay distance d by optical delay 160 to the local oscillator 150 causes the local oscillator (LO) arm 150 and the scattered light arm Rx to be balanced, and therefore correlated, at a target distance d/2 (round trip distance d). This allows for the engineering or selection of what target distances will experience decoherence losses. One approach is to set the local oscillator delay 160 to match twice the maximum desired target distance between the scanner 130 and target 190, which will then have close targets experience the worst decoherence losses. However, nearby targets also have the highest amount of light available to harvest, which in many cases will result in a wider set of target ranges that yield a signal above the noise floor. As an example, a LiDAR system can be configured for use with a target distance of 150 feet and a round trip distance of 300 feet, where the delay distance is 300 feet. The inclusion of the delay will operate to cancel out the loss due to non-zero linewidth.

In some cases, the target distance may not always have a fixed value. A LiDAR system can incorporate a variable or adjustable delay to facilitate operation in such instances. For example, a LiDAR system can be configured to provide a first delay of 300 feet for targets at 150 feet, and a second delay of 1000 feet for targets at 500 feet. In this way, LiDAR systems can be designed to analyze different target distances.

Figure 2:
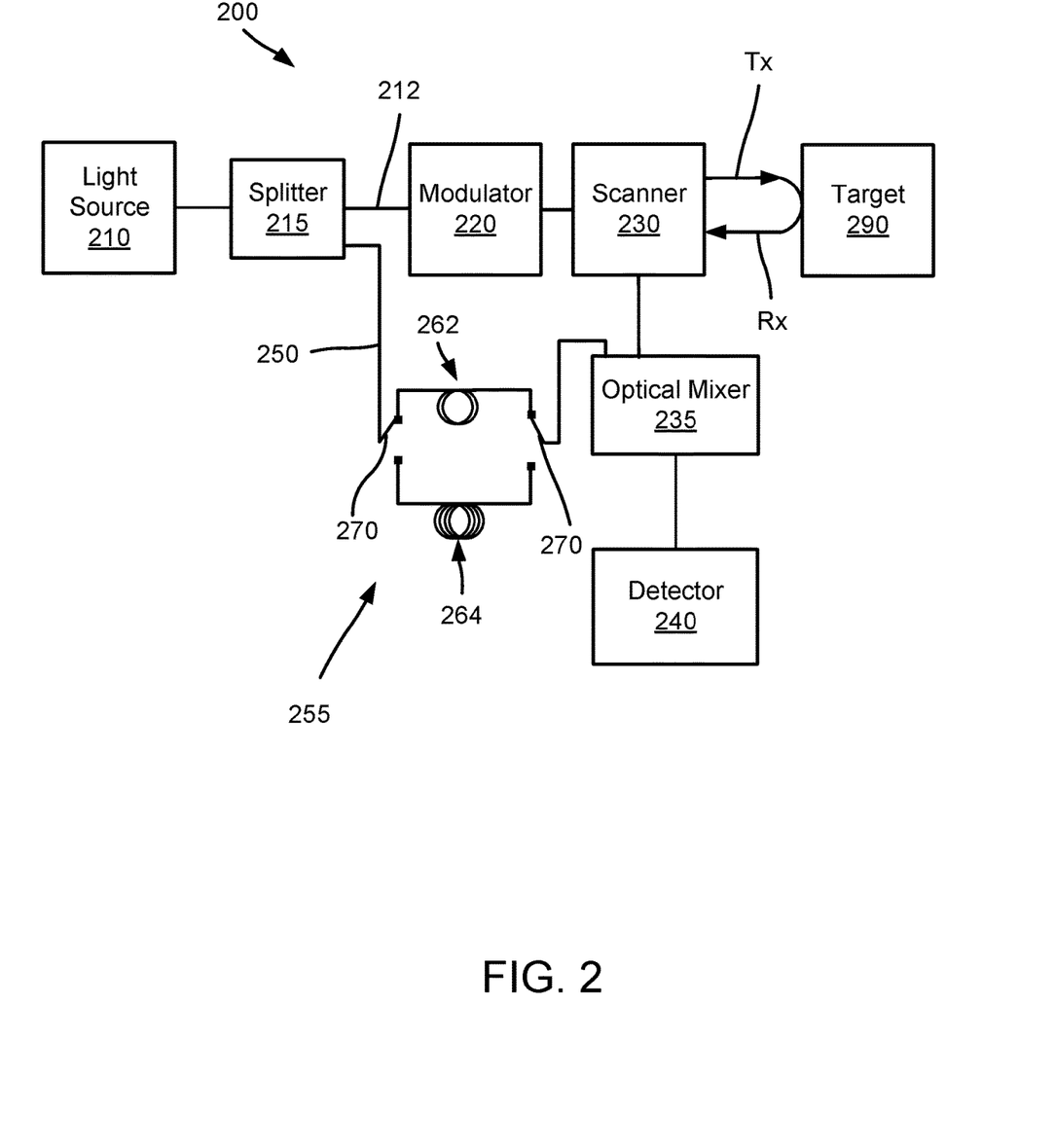
FIG. 2 illustrates a block diagram of a LiDAR system having an optical switching circuit with multiple optical delay lines in parallel.

FIG. 2 schematically illustrates aspects of an exemplary coherent LiDAR system 200, according to embodiments of the present invention. The system 200 shown in FIG. 2 can include one or more features of, or can perform one or more of the functional aspects of, the system 100 shown in FIG. 1. As shown in FIG. 2, system 200 includes a light source 210, a splitter 215, a modulator 220, a scanner 230, an optical mixer 235, and a detector 240. In operation, light 212 from the light source 210 is modulated by the modulator 220 and sent through the scanner 230 to a target 290. A transmitter beam Tx (incident light) is emitted from the scanner 230, and scattered or reflected by the target 290 to provide a receiver beam Rx (scattered light). The scattered light Rx is collected and combined with the local oscillator reference beam 250 by the optical mixer 235 and detected by the detector 240. The Rx light has the modulation pattern from the modulator and is delayed due to the travel time to the target 290. This information can be extracted by the detector 240 when combined with the reference beam and is used to calculate the distance to the target 290.

System 200 includes an optical switching circuit 255 having an optical switch 270 that can operate to incorporate either a first local oscillator delay 262 or a second local oscillator delay 264 into the local oscillator reference beam 250. As shown here, the first local oscillator delay 262 and the second local oscillator delay 264 are arranged in parallel. In use, the optical switch 270 can operate to change between different local oscillator delays (262, 264) to switch the LiDAR system 200 between different sets of detection ranges. This can allow the system 200 to balance the detection arms at two or more ranges. In some cases, an optical switch can be integrated to switch the local oscillator between two or more sets of delays to give the LiDAR system two or more sets of ranges it can address. For example, the first delay 262 may provide a 300-foot delay while the second delay 264 may provide a 1000-foot delay.

Figure 3:
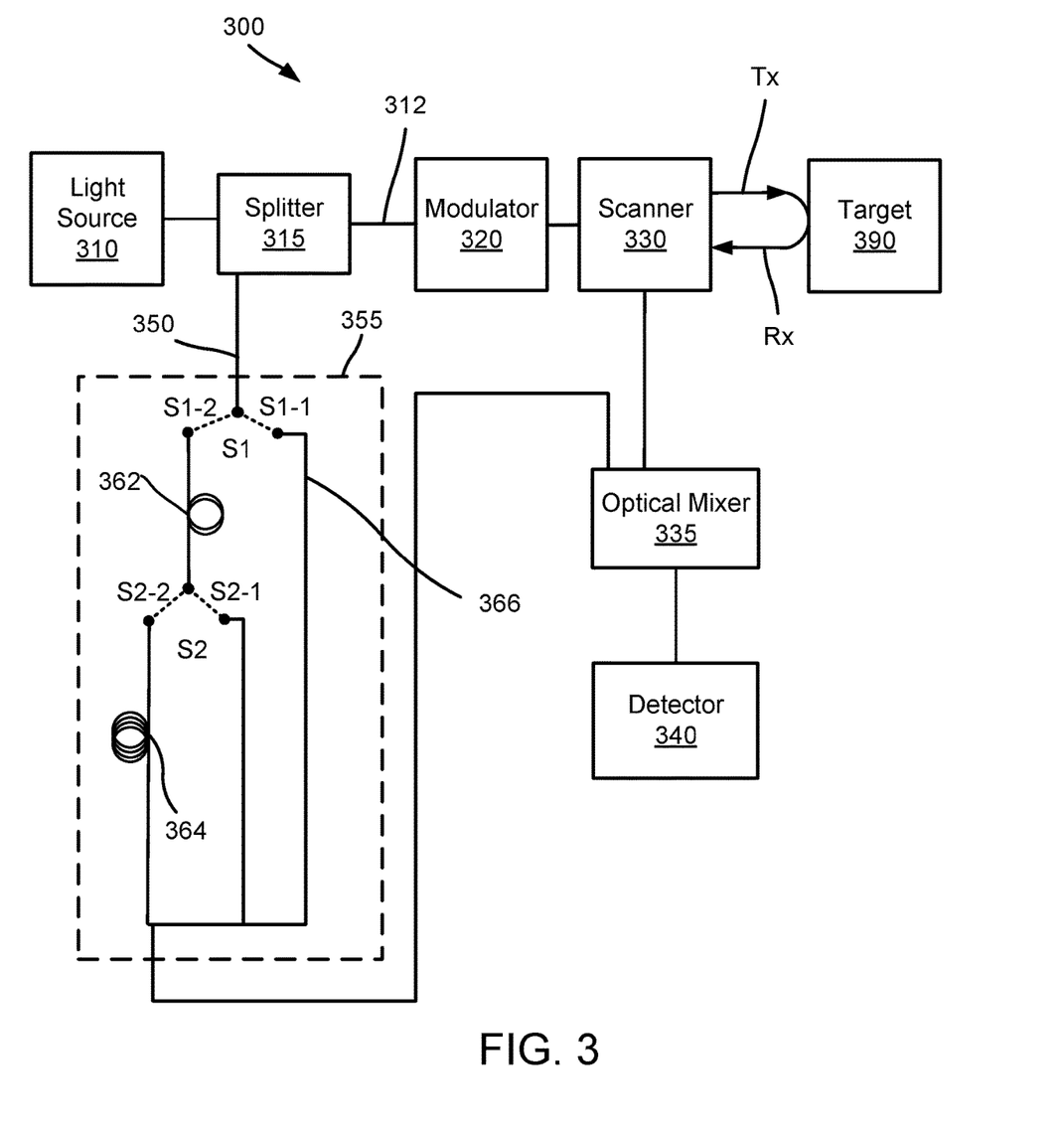
FIG. 3 illustrates a block diagram of a LiDAR system having an optical switching circuit with multiple optical delay lines in series.

FIG. 3 schematically illustrates aspects of an exemplary coherent LiDAR system 300, according to embodiments of the present invention. The system 300 shown in FIG. 3 can include one or more features of, or can perform one or more of the functional aspects of, the system 100 shown in FIG. 1 or the system 200 shown in FIG. 2. As illustrated in FIG. 3, system 300 includes a light source 310, a splitter 315, a modulator 320, a scanner 330, an optical mixer 335, and a detector 340. In operation, light 312 from the light source 310 is modulated by the modulator 320 and sent through the scanner 330 to a target 390. A transmitter beam Tx (incident light) is emitted from the scanner 330, and reflected by the target 390 to provide a receiver beam Rx (scattered light). The scattered light Rx is collected and combined with the local oscillator reference beam 350 by the optical mixer 335 and detected by the detector 340. In some embodiments, the distance to the target object can be calculated based on the speed of the energy and the time it takes for energy to travel to the target object and back to the detector.

System 300 includes an optical switching circuit 355 having two optical switches S1 and S2 that can operate to incorporate either no delay 366 (D0), a first local oscillator delay 362 (D1), or a first local oscillator delay 362 (D1) in series with a second local oscillator delay 364 (D2) into the local oscillator reference beam 350. As shown here, the first local oscillator delay 362 and the second local oscillator delay 364 are arranged in series. In use, the optical switches S1 and S2 can operate to change between different local oscillator delays (362, 364, 366) to switch the LiDAR system 300 between different sets of detection ranges. This can allow the system 300 to balance the detection arms at three or more ranges. In some cases, an optical switch can be integrated to switch the local oscillator between two or more sets of delays to give the LiDAR system two or more sets of ranges it can address. For example, first delay 362 can provide a 30 foot delay and second delay 364 can provide a 70 foot delay. In some cases, an optical switching circuit that is arranged in series can provide a more spatially compact design as compared with an optical switching circuit that is arranged in parallel.

Table 1 provided below illustrates how the settings of the optical switches can be configured (e.g. by setting optical switch S1 to provide connection S1-1 or connection S1-2), so as to achieve the desired optical delay effect for the optical switching circuit 355.

TABLE 1

|  | S1 | S2 |
|---|---|---|
| D0 (No Delay) | S1-1 | — |
| D1 Delay | S1-2 | S2-1 |
| D1 + D2 Delay | S1-2 | S2-2 |

Figure 4:
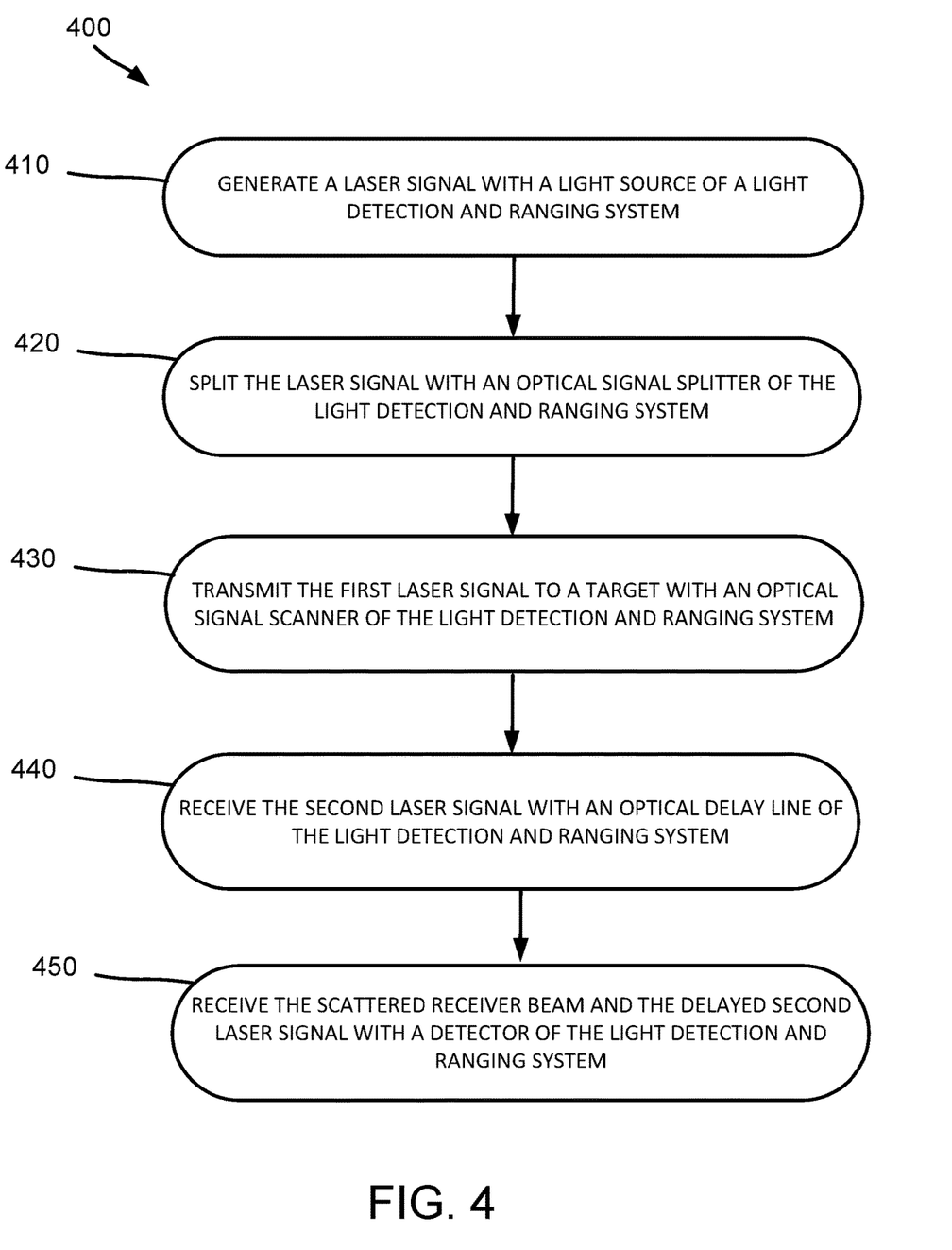
FIG. 4 illustrates example operations for utilizing an example LiDAR system having an optical delay line.

FIG. 4 illustrates example operations 400 for utilizing an example LiDAR system ledger described herein. One or more of the operations 400 may be implemented or controlled using a processor on a LiDAR system (such as the LiDAR system 100 illustrated in FIG. 1).

An operation 410 generates a laser signal with a light source of the light detection and ranging system. In some cases, operation 410 can involve generating any desired type of electromagnetic waves using an electromagnetic wave source.

An operation 420 splits the laser signal with an optical signal splitter circuit of the light detection and ranging system, for example to produce a first laser signal for transmission to a target and a second laser signal.

An operation 430 transmits the first laser signal to the target with an optical signal scanner of the light detection and ranging system. The first laser signal is reflected by the target to produce a scattered receiver beam.

An operation 440 receives the second laser signal with an optical delay line of the light detection and ranging system. The optical delay line adds a predetermined time delay to the second laser signal to generate a delayed second laser signal.

An operation 450 receives the scattered receiver beam and the delayed second laser signal with a detector of the light detection and ranging system.

As disclosed elsewhere herein, an optical switch can be integrated to switch the local oscillator between two or more sets of delays to give the LiDAR system two or more sets of ranges it can address. This can be accomplished by interleaving frames (e.g. one short range frame, followed by a long range frame) or by switching to different detection modes as specified by a decision algorithm. Such an optical delay line can enable the use of an affordable laser (which can be a difficult cost point in coherent LiDAR) to achieve the same performance, or alternatively improved performance from the same laser.

A LiDAR system can incorporate a variable or adjustable delay to facilitate operation in such instances. For example, a LiDAR system can be configured to provide switching between a first delay of 300 feet for targets at 150 feet, and a second delay of 1000 feet for targets at 500 feet. In this way, LiDAR systems can be designed to analyze different target distances. Such LiDAR systems can also incorporate a multiplex functionality in the time domain, whereby signals associated with the first delay alternate with signals associated with the second delay (e.g. one signal per microsecond) due to operation of the switching circuit.

Figure 5:
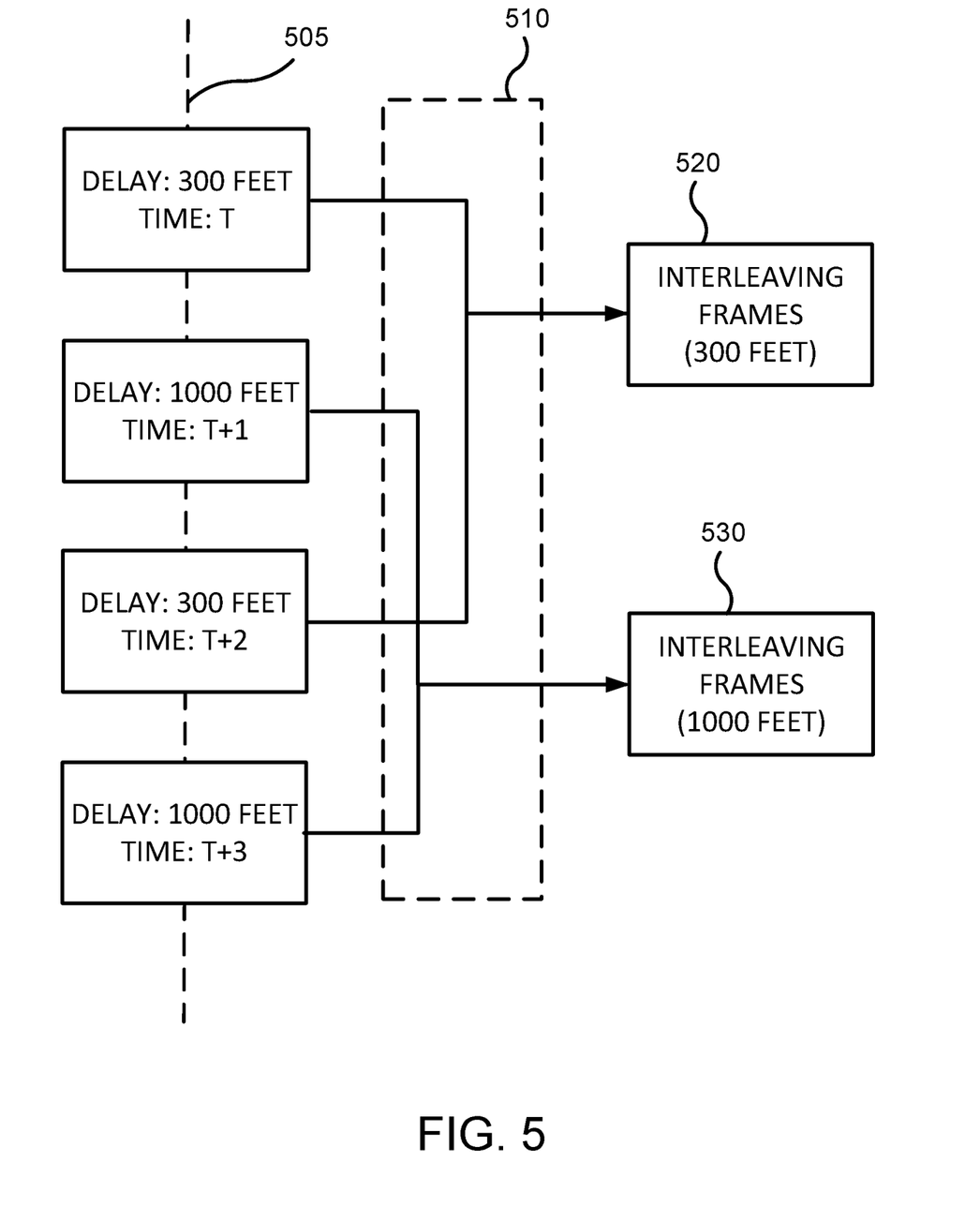
FIG. 5 illustrates a schematic of a method for performing interleaving in an LiDAR system.

FIG. 5 depicts aspects of an interleaving circuit 510 (e.g. a laser signal interleaving circuit) that can be used in a LiDAR system to evaluate such signals. As shown here, a series of signals 505 corresponding to two target ranging distances (150 feet, 500 feet) can be processed by the interleaving circuit 510 to produce a first set of interleaving frames 520 corresponding to the first target ranging distance and a second set of interleaving frames 530 corresponding to the second target ranging distance. In this way, the LiDAR system may switch between two or more optical delays, and acquire a complete image (frame) with each of the delays. Each frame will then be optimized for a particular set of ranges depending on the delay for that particular frame. In the illustrated implementation, the LiDAR system switched between 300 and 1000 ft delays. Such switching may be, for example, 12 times per second, so that the LiDAR can acquire a complete image ("frame") with each delay. In some cases, an optical delay line switch can be configured to select a different combination of two or more optical delay lines, where each of the different combinations correspond to one of the two or more temporally interleaving frames.

Figure 6:
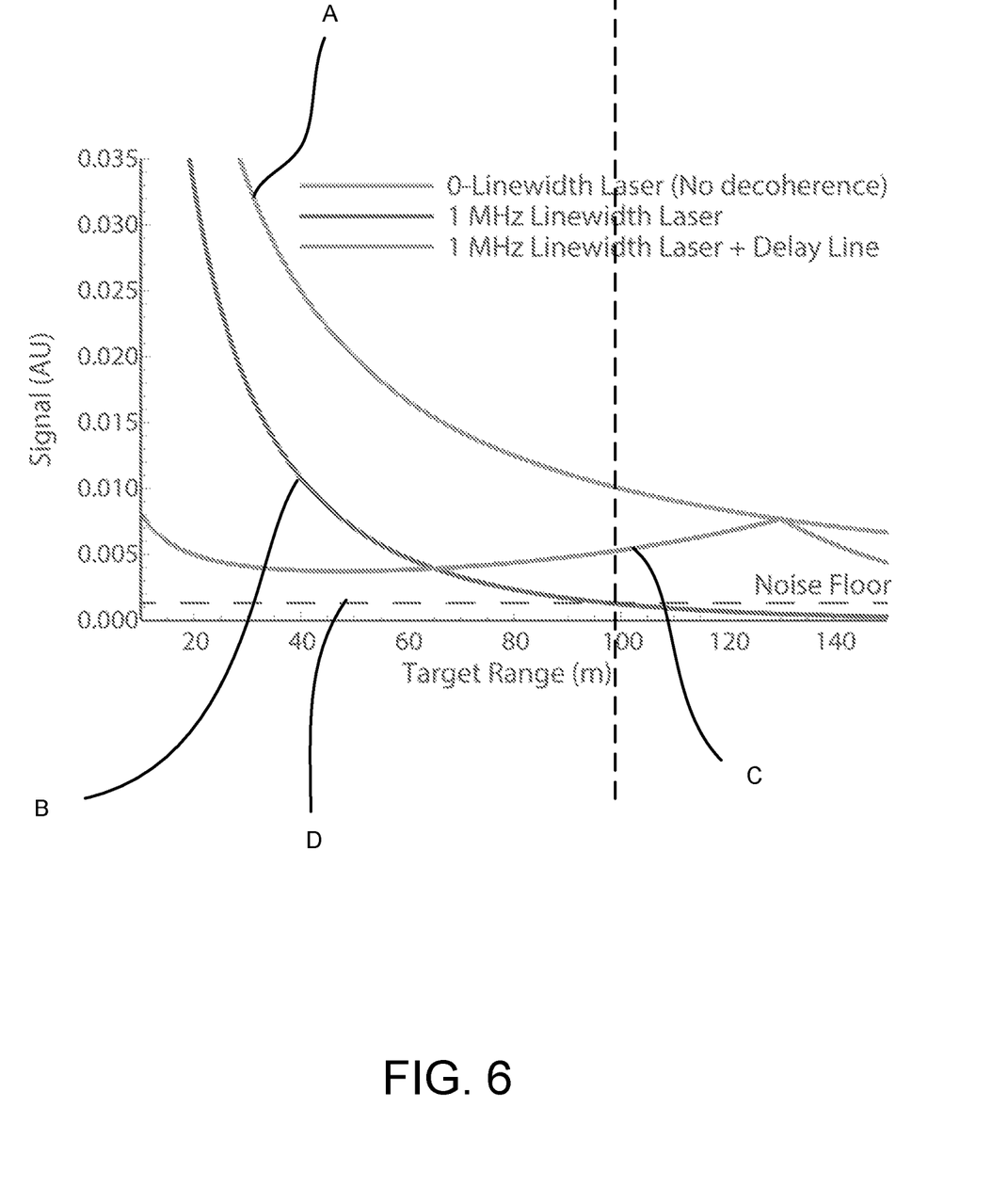
FIG. 6 illustrates a comparison graph of signal-to-noise ratio (SNR) curves for two LiDAR systems.

FIG. 6 illustrates a comparison of relative signal-to-noise ratio (SNR) curves between two LiDAR systems with 1 MHz laser linewidth. Curve A corresponds to a LiDAR system having no decoherence, and shows the signal decrease purely as a function of collected power. Curve B corresponds to a LiDAR system having no delay line, and a 1 MHz linewidth. The signal drops off much more quickly with distance as decoherence effects become significant. Curve C corresponds to a LiDAR system having a 240 m delay on the local oscillator. The system with no delay arm, as represented by B, is designed to have a maximum target range of 100 m before it hits the noise floor (horizontal line D). The noise floor D represents the limit of detectability. The system with a 240 m delay arm brings the signal up so that it does not hit the noise floor until the target is past a 150 m distance, improving the maximum range by more than 50 m. Note that the system with the 240 m LO delay produces a lower signal at sub-60 m ranges than the standard system, but the large amount of light collected from nearby targets ensures the signal remains well above the noise floor and is readily detectable. Therefore, the addition of the delay arm has improved the system maximum range with no other trade-offs.

Figure 7:
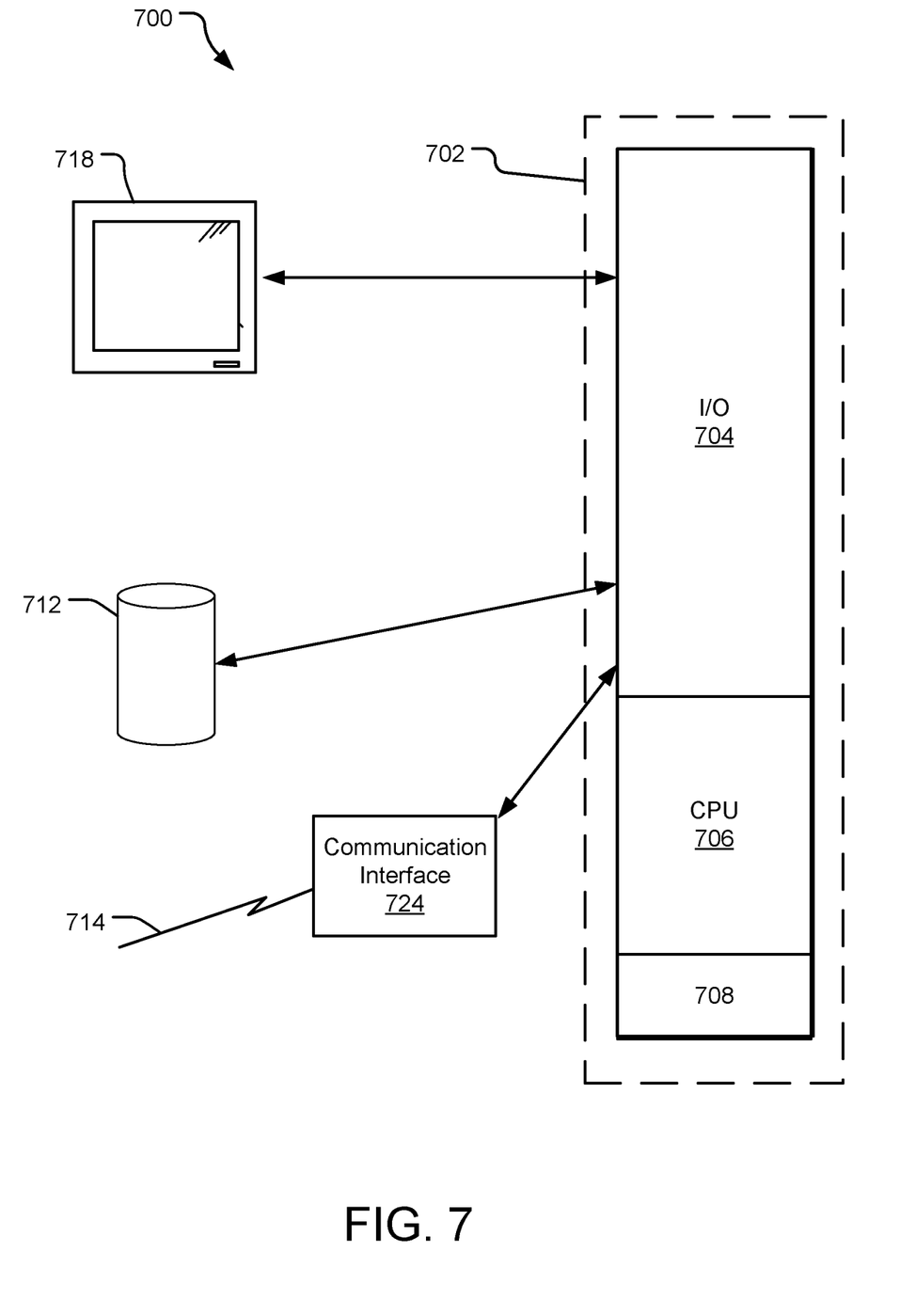
FIG. 7 illustrates an example processing system that may be useful in implementing the described technology.

FIG. 7 illustrates an example processing system 700 that may be useful in implementing the described technology. The processing system 700 is capable of executing a computer program product embodied in a tangible computer-readable storage medium to execute a computer process. Data and program files may be input to the processing system 700, which reads the files and executes the programs therein using one or more processors (CPUs or GPUs). Some of the elements of a processing system 700 are shown in FIG. 7 wherein a processor 702 is shown having an input/output (I/O) section 704, a Central Processing Unit (CPU) 706, and a memory section 708. There may be one or more processors 702, such that the processor 702 of the processing system 700 comprises a single central-processing unit 706, or a plurality of processing units. The processors may be single core or multi-core processors. The processing system 700 may be a conventional computer, a distributed computer, or any other type of computer. The described technology is optionally implemented in software loaded in memory 708, a storage unit 712, and/or communicated via a wired or wireless network link 714 on a carrier signal (e.g., Ethernet, 3G wireless, 8G wireless, LTE (Long Term Evolution)) thereby transforming the processing system 700 in FIG. 7 to a special purpose machine for implementing the described operations. The processing system 700 may be an application specific processing system configured for supporting one or more aspects of a LiDAR system.

The I/O section 704 may be connected to one or more user-interface devices (e.g., a keyboard, a touch-screen display unit 718, etc.) or a storage unit 712. Computer program products containing mechanisms to effectuate the systems and methods in accordance with the described technology may reside in the memory section 508 or on the storage unit 712 of such a system 700.

A communication interface 724 is capable of connecting the processing system 700 to an enterprise network via the network link 714, through which the computer system can receive instructions and data embodied in a carrier wave. When used in a local area networking (LAN) environment, the processing system 700 is connected (by wired connection or wirelessly) to a local network through the communication interface 724, which is one type of communications device. When used in a wide-area-networking (WAN) environment, the processing system 700 typically includes a modem, a network adapter, or any other type of communications device for establishing communications over the wide area network. In a networked environment, program modules depicted relative to the processing system 700 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 708 and/or the storage unit 712 and executed by the processor 702. Further, local computing systems, remote data sources and/or services, and other associated logic represent firmware, hardware, and/or software, which may be configured to assist in supporting a LiDAR system. One or more aspects of a LiDAR system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 708 and/or the storage unit 712 and executed by the processor 702.

The processing system 700 may be implemented in a device, such as a user device, storage device, IoT device, a desktop, laptop, computing device. The processing system 700 may execute in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
   a light source configured to generate a laser signal;
   an optical signal splitter circuit configured to split the laser signal into a first laser signal for transmission to a plurality of targets and a second laser signal;
   an optical signal scanner configured to transmit the first laser signal to the plurality of targets;
   two or more optical delay lines configured to receive the second laser signal, wherein each of the two or more optical delay lines adds a predetermined time delay to the second laser signal to generate a delayed second laser signal;
   a laser signal interleaving circuit configured to interleave the second laser signal and the delayed second laser signal in two or more temporally interleaving frames, wherein the second laser signal and the delayed second laser signal correspond to different target ranging distances; and
   a detector configured to receive a reflected laser signal from the plurality of targets, wherein the reflected laser signal includes the interleaved frames acquired with the predetermined time delays.

2. The system of claim 1, further comprising an optical delay line switch configured to select a combination of the two more optical delay lines such that the predetermined time delay added to the second laser signal is substantially twice the distance of the plurality of targets from the scanner.

3. The system of claim 2, wherein the optical delay line switch is configured to select a different combination of two or more of the optical delay lines.

4. The system of claim 3, wherein each of the different combinations corresponding to one of the two or more temporally interleaving frames.

5. The system of claim 3, wherein each of the different combinations of the two or more of the optical delay lines is configured to delay the second laser signal by a distance that is substantially of an order of magnitude of a distance of one of the plurality of targets.

6. The system of claim 5, wherein the detector is configured to temporally correlate interleaving frames from the reflected laser signal with a corresponding delayed frame of second laser signal.

7. The system of claim 5, wherein the detector is configured to detect a distance of one of the plurality of targets from the scanner and wherein the optical delay line switch configured to select combination of the two more optical delay lines based on the detected distance.

8. A method of operating a light detection and ranging system, the method comprising:
   generating a laser signal with a light source of the light detection and ranging system;
   splitting the laser signal with an optical signal splitter circuit of the light detection and ranging system to produce a first laser signal for transmission to a target and a second laser signal;
   interleaving the second laser signal in two or more temporally interleaving frames with a laser signal interleaving circuit of the light detection and ranging system;
   transmitting the first laser signal to the target with an optical signal scanner of the light detection and ranging system, wherein the first laser signal is reflected by the target to produce a scattered receiver beam;
   receiving the second laser signal with an optical delay line of the light detection and ranging system, wherein the optical delay line adds a predetermined time delay to the second laser signal to generate a delayed second laser signal; and
   receiving a reflected laser signal from a plurality of targets, wherein the reflected laser signal includes the interleaved frames acquired with the predetermined time delays with a detector of the light detection and ranging system.

9. The method of claim 8, wherein the optical delay line is a first optical delay line that adds a first predetermined time delay, wherein the light detection and ranging system further comprises an optical delay line switch and a second optical delay line that adds a second predetermined time delay, wherein the target is located at a target distance from the scanner, and wherein the optical delay line switch is configured to select either the first optical delay line or the second optical delay line, so that the target distance corresponds to substantially half of the selected first predetermined time delay or second predetermined time delay.

10. The method of claim 9, further comprising selecting a different combination of two or more of the optical delay lines.

11. The method of claim 8, wherein the optical delay line is a first optical delay line that adds a first predetermined time delay, wherein the light detection and ranging system further comprises an optical delay line switch and a second optical delay line that adds a second predetermined time delay, wherein the target is located at a target distance from the scanner, and wherein the optical delay line switch is configured to select either the first optical delay line or a combination of the first optical delay line and the second optical delay line, so that the target distance corresponds to substantially half of the selected first predetermined time delay or combined first predetermined time delay and second predetermined time delay.

12. The method of claim 11, wherein the optical delay line switch comprises a first optical switch S1, an second optical switch S2, and a third optical switch S3, wherein the first optical switch S1 is positioned between the light source and the second optical switch S2, wherein the second optical switch S2 is positioned between the first optical switch S1 and the third optical switch S3, and wherein the third optical switch S3 is positioned between the second optical switch S2 and the detector.

13. The method of claim 8, wherein the optical delay line comprises a long fiber.

14. The method of claim 8, wherein the optical delay line comprises an optical cavity.

15. A light detection and ranging system, comprising:
 a light source that provides an incident light beam and a local oscillator reference beam;
 a scanner that directs the incident light beam toward a target, wherein the incident light beam is reflected by the target to produce a scattered receiver beam;
 an interleaving circuit that provides a first set of interleaving frames corresponding to a first local oscillator delay and a second set of interleaving frames corresponding to a second local oscillator delay;
 a delay assembly that converts the local oscillator reference beam to a delayed reference beam; and
 a detector that receives the delayed reference beam and the scattered receiver beam including the interleaved frames with the predetermined time delays.

16. The system of claim 15, wherein the delay assembly includes an artificial delay line comprising a member selected from the group consisting of a long fiber and an optical cavity.

17. The system of claim 15, wherein the delay assembly includes an optical switching circuit comprising an optical switch, a first local oscillator delay, and a second local oscillator delay, wherein the first local oscillator delay and the second local oscillator delay are arranged in parallel.

18. The system of claim 17, wherein the delay assembly is configured to select a different combination of two or more of the optical delay lines.

19. The system of claim 15, wherein the delay assembly includes an optical switching circuit comprising an optical switch, a first local oscillator delay, and a second local oscillator delay, wherein the first local oscillator delay and the second local oscillator delay are arranged in series.

20. The system of claim 19, further comprising an interleaving circuit that provides a first set of interleaving frames corresponding to the first local oscillator delay and a second set of interleaving frames corresponding to a combination of the first local oscillator delay and the second local oscillator delay.

\* \* \* \* \*